United States Patent
Campbell et al.

(10) Patent No.: US 11,713,679 B1
(45) Date of Patent: Aug. 1, 2023

(54) TANGENTIALLY BOWED AIRFOIL

(71) Applicant: RAYTHEON TECHNOLOGIES CORPORATION, Farmington, CT (US)

(72) Inventors: Christian X. Campbell, West Hartford, CT (US); Howard J. Liles, Newington, CT (US); Russell Kim, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/585,760

(22) Filed: Jan. 27, 2022

(51) Int. Cl.
*F01D 5/28* (2006.01)
*F01D 5/14* (2006.01)

(52) U.S. Cl.
CPC ............ *F01D 5/141* (2013.01); *F01D 5/282* (2013.01); *F05D 2220/32* (2013.01); *F05D 2250/71* (2013.01); *F05D 2300/6033* (2013.01)

(58) Field of Classification Search
CPC ...... F01D 5/141; F01D 5/282; F05D 2220/32; F05D 2250/71; F05D 2300/6033
See application file for complete search history.

(56) References Cited

U.S. PATENT DOCUMENTS

| | | | | |
|---|---|---|---|---|
| 4,334,824 A | * | 6/1982 | Tsuchikawa | F04D 29/382 416/240 |
| 4,737,077 A | * | 4/1988 | Vera | F01D 5/141 416/169 A |
| 5,716,192 A | * | 2/1998 | Phillips | F01D 5/141 415/115 |
| 6,398,489 B1 | * | 6/2002 | Burdgick | F01D 5/141 415/115 |
| 7,435,058 B2 | | 10/2008 | Campbell et al. | |
| 9,074,483 B2 | * | 7/2015 | Breeze-Stringfellow | F01D 5/141 |
| 10,526,894 B1 | | 1/2020 | Rose et al. | |
| 2003/0035723 A1 | * | 2/2003 | Decker | F04D 29/544 415/211.2 |
| 2012/0063908 A1 | * | 3/2012 | Islam | F01D 5/141 416/223 A |
| 2012/0243983 A1 | * | 9/2012 | Breeze-Stringfellow | F01D 5/148 415/208.1 |
| 2013/0045088 A1 | * | 2/2013 | Baumann | F01D 5/20 29/889.7 |
| 2013/0094942 A1 | * | 4/2013 | MacKay | F01D 5/145 29/889.21 |

(Continued)

FOREIGN PATENT DOCUMENTS

| | | | | | |
|---|---|---|---|---|---|
| CN | 112943382 A | * | 6/2021 | | F01D 5/141 |
| EP | 3108101 B1 | * | 4/2022 | | F01D 5/141 |
| GB | 2471152 A | * | 12/2010 | | F01D 5/141 |

*Primary Examiner* — Igor Kershteyn
*Assistant Examiner* — Theodore C Ribadeneyra
(74) *Attorney, Agent, or Firm* — Carlson, Gaskey & Olds, P.C.

(57) ABSTRACT

A gas turbine engine includes a turbine section that has a plurality of turbine vanes. Each of the turbine vanes includes inner and outer platforms and an airfoil section that extends there between. The airfoil section is hollow and rib-less and has a first end at the outer platform and a second end at the inner platform. The airfoil section is tangentially bowed from the first end to the second end with a radius of curvature that is from 17 centimeters to 130 centimeters.

18 Claims, 4 Drawing Sheets

(56) References Cited

U.S. PATENT DOCUMENTS

| | | | |
|---|---|---|---|
| 2015/0218955 A1* | 8/2015 | Bintz | F01D 5/20 |
| | | | 416/1 |
| 2015/0345297 A1* | 12/2015 | Neu | F01D 5/141 |
| | | | 415/115 |
| 2018/0363472 A1* | 12/2018 | Baek | F01D 5/141 |
| 2019/0106989 A1* | 4/2019 | Nash | F01D 5/141 |
| 2019/0128124 A1* | 5/2019 | Baek | F01D 5/16 |
| 2019/0257243 A1* | 8/2019 | Gupta | F01D 17/165 |
| 2019/0353083 A1* | 11/2019 | Wichers | F01P 5/02 |

\* cited by examiner

TANGENTIALLY BOWED AIRFOIL

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a turbine section having a plurality of turbine vanes. Each of the turbine vanes includes inner and outer platforms and an airfoil section that extends there between. The airfoil section is hollow and rib-less and has a first end at the outer platform and a second end at the inner platform. The airfoil section is tangentially bowed from the first end to the second end with a radius of curvature that is from 17 centimeters to 130 centimeters.

In a further embodiment of any of the foregoing embodiments, the radius of curvature is from 17 centimeters to 51 centimeters.

In a further embodiment of any of the foregoing embodiments, the airfoil section defines an internal cavity that has a cavity trailing end fillet that tapers from the outer platform to the inner platform.

In a further embodiment of any of the foregoing embodiments, the cavity trailing end fillet tapers by 1 degree to 3 degrees relative to a radial direction.

In a further embodiment of any of the foregoing embodiments, the airfoil section is axially bowed from the first end to the second end.

In a further embodiment of any of the foregoing embodiments, the airfoil section is axially bowed with a radius of curvature that is from 7 centimeters to 20 centimeters.

In a further embodiment of any of the foregoing embodiments, the airfoil section defines a leading end, a trailing end, a chord length from the leading end to the trailing end, and the airfoil section tapers from the outer platform to the inner platform such that the chord length decreases from the outer platform to the inner platform.

In a further embodiment of any of the foregoing embodiments, each of the leading end and the trailing end tapers by 1 degree to 3 degrees relative to a radial direction.

In a further embodiment of any of the foregoing embodiments, each of the turbine vanes is ceramic matrix composite.

In a further embodiment of any of the foregoing embodiments, the airfoil section defines an internal cavity that has a cavity trailing end fillet that tapers from the outer platform to the inner platform by 1 degree to 3 degrees relative to a radial direction. The airfoil section is axially bowed from the first end to the second end with a radius of curvature that is from 7 centimeters to 20 centimeters, In a further embodiment of any of the foregoing embodiments, the airfoil section defines a leading end, a trailing end, a chord length from the leading end to the trailing end, and the airfoil section tapers from the outer platform to the inner platform such that the chord length decreases from the outer platform to the inner platform. Each of the leading end and the trailing end tapering by 1 degree to 3 degrees relative to the radial direction.

An airfoil according to an example of the present disclosure includes inner and outer platforms and an airfoil section that extends there between. The airfoil section is hollow and rib-less and has a first end at the inner platform and a second end at the outer platform. The airfoil section is tangentially bowed from the first end to the second end with a radius of curvature that is from 17 centimeters to 130 centimeters.

In a further embodiment of any of the foregoing embodiments, the radius of curvature is from 17 centimeters to 51 centimeters.

In a further embodiment of any of the foregoing embodiments, the airfoil section defines an internal cavity that has a cavity trailing end fillet that tapers from the outer platform to the inner platform by 1 degree to 3 degrees relative to a radial direction.

In a further embodiment of any of the foregoing embodiments, the airfoil section is axially bowed from the first end to the second end with a radius of curvature that is from 7 centimeters to 20 centimeters.

In a further embodiment of any of the foregoing embodiments, the airfoil section defines a leading end, a trailing end, a chord length from the leading end to the trailing end, and the airfoil section tapers from the outer platform to the inner platform such that the chord length decreases from the outer platform to the inner platform. Each of the leading end and the trailing end tapering by 1 degree to 3 degrees relative to a radial direction.

In a further embodiment of any of the foregoing embodiments, the inner and outer platforms and the airfoil section are ceramic matrix composite.

In a further embodiment of any of the foregoing embodiments, the airfoil section defines an internal cavity that has a cavity trailing end fillet that tapers from the outer platform to the inner platform by 1 degree to 3 degrees relative to a radial direction, the airfoil section is axially bowed from the first end to the second end with a radius of curvature that is from 7 centimeters to 20 centimeters, airfoil section defines a leading end, a trailing end, a chord length from the leading end to the trailing end, and the airfoil section tapers from the outer platform to the inner platform such that the chord length decreases from the outer platform to the inner platform, and each of the leading end and the trailing end tapering by 1 degree to 3 degrees relative to the radial direction.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
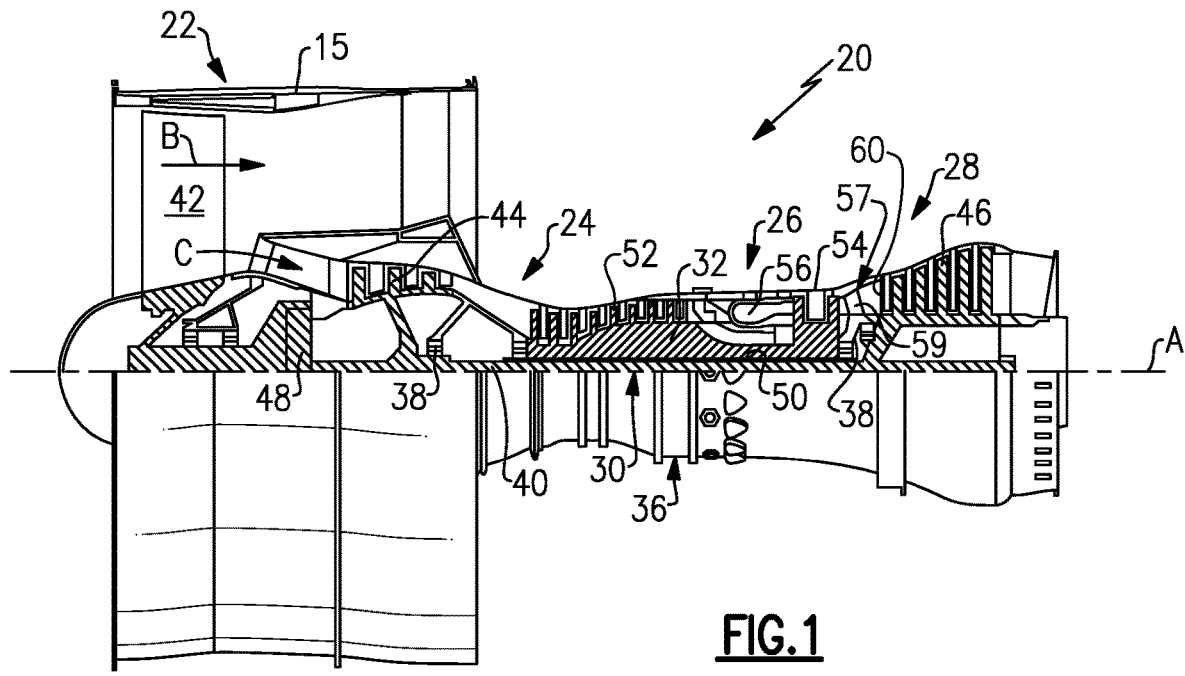
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
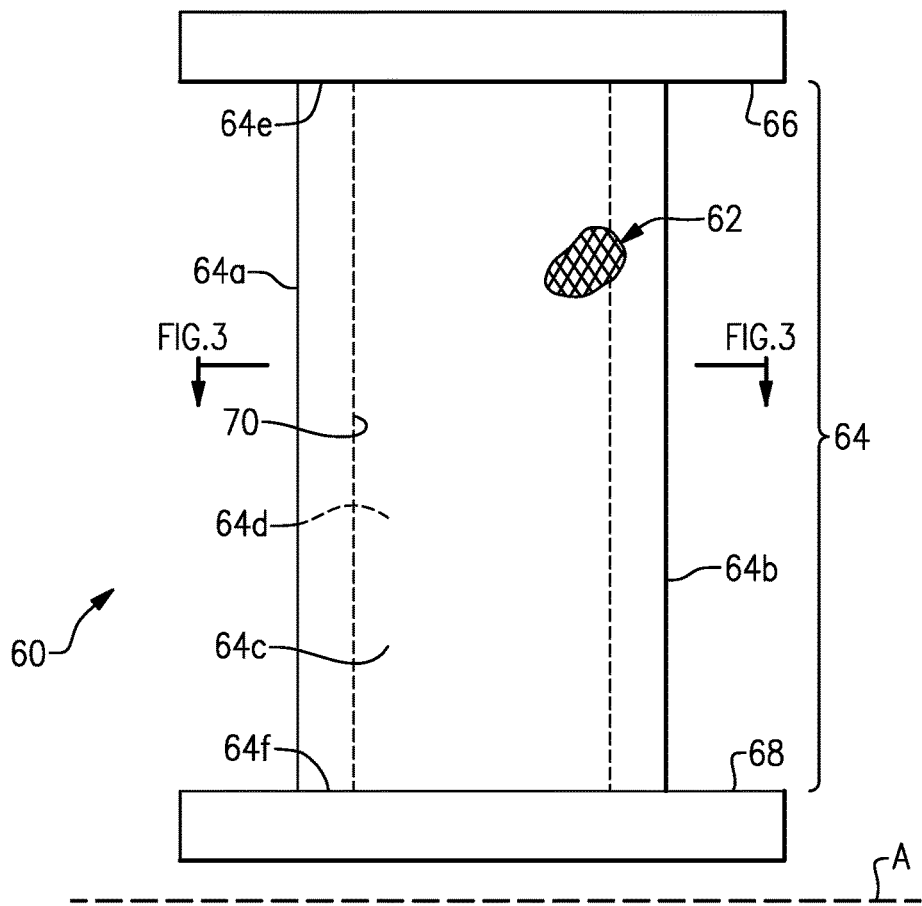
FIG. 2 illustrates a turbine vane from the engine.
Figure 3:
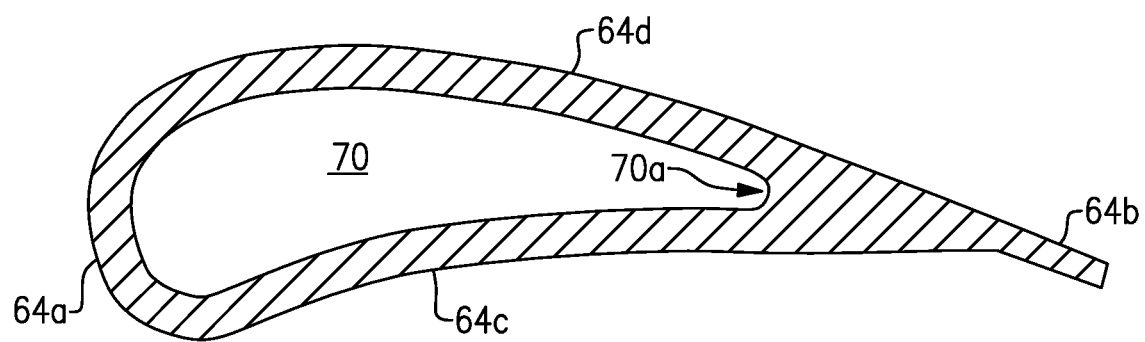
FIG. 3 illustrates a sectioned view of the vane.

FIG. 2 illustrates an example turbine vane 60 from the turbine section 28 of the engine 20 (see also FIG. 1), and FIG. 3 illustrates a sectioned view of the vane 60. For instance, the vane 60 is supported between inner and outer support hardware and there are multiple vanes 60 arranged in a circumferential row in the engine 20.

The vane 60 in the illustrated example is formed of a fiber-reinforced composite 62 (shown in partial cutaway view). For example, the fiber-reinforced composite 62 is a ceramic matrix composite ("CMC"). Although the examples herein are directed to CMC vanes, vanes formed of other materials, such as organic matrix composites, metal matrix composites, or metallic alloys, may also benefit from the examples. For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply or a 3D structure.

In the illustrated example, the vane 60 is comprised of a hollow airfoil section 64 and first (outer) and second (inner) platforms 66/68 between which the airfoil section 64 extends. The airfoil section 64 circumscribes an internal cavity 70 and defines leading and trailing ends 64a/64b and first and second sides 64c/64d that join the leading and trailing ends 64a/64b. The airfoil section 64 has only the single, central cavity 70 and is rib-less in that there are no ribs that extend substantially across the cavity 70 or that extend across the cavity 70 to connect the sides 64c/64d. The term "rib-less" does not preclude partial ribs that extend less than about 75% of the distance across the cavity 70, as these are less likely to substantially hinder mandrel or tool removal during manufacturing or require a mandrel or mandrels that may easily break. In this example, the first side 64c is a pressure side and the second side 64d is a suction side. The airfoil section 64 spans radially, relative to the central engine axis A, between an outer (first) radial end 64e to an inner (second) radial end 64f. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

In general, turbine vanes usually have an internal rib that serves to stiffen and strengthen the structure, increase modal frequencies, and divide the cavity into separate flow channels. A rib also facilitates reductions in bending on the fillets of the cavity that can generate through-thickness stresses. While such stresses are generally not of concern for vanes formed of isotropic material such as metallic alloy, bending tends to cause interlaminar stresses on the leading end, trailing end, and suction side of an airfoil made of in layered composite materials such as CMCs. Although such stresses may be mitigated by use of a rib, a rib in a CMC component may contribute to thermal stresses, hinder baffle design, hinder cooling flow-through, hinder mandrel removal during manufacturing, and require a small mandrel or mandrels that are more prone to breaking. In these regards, as discussed below, the vane 60 provides for a rib-less design, while facilitating stiffening and strengthening of the airfoil structure.

Figure 4:
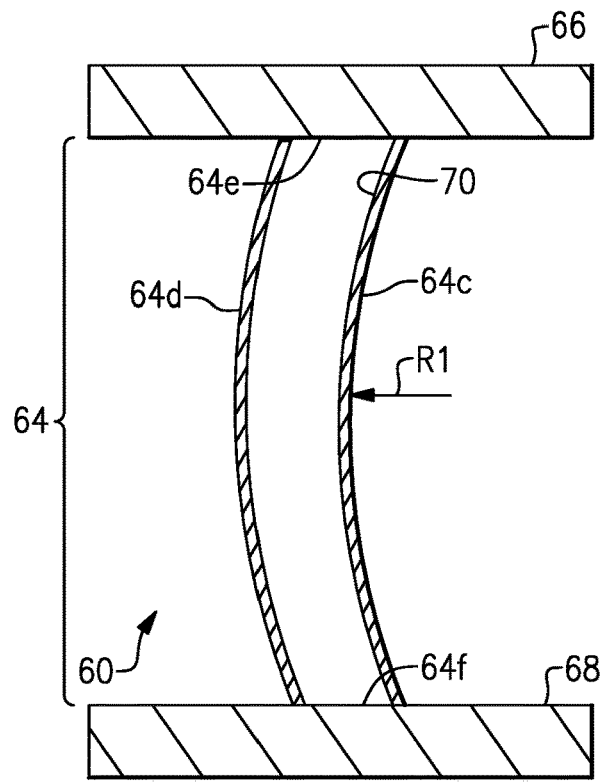
FIG. 4 illustrates an axial view of a tangential bow of the vane.

FIG. 4 illustrates a profile of a sectioned, axial view of the vane 60. As shown, the airfoil section 64 is tangentially bowed from the outer end 64e to the inner end 64f as denoted by radius of curvature (R1) relative to side 64c. For instance, both the first and second sides 64c/64d of the airfoil section are continuously bowed over the full span of the airfoil section 64 from the outer end 64e to the inner end 64f. That is, the side 64c is bowed at the radius (R1) over the full span. The side 64d is equidistant from the side 64c at all points over the full span and is thus bowed at a radius equivalent to the sum of the radius (R1) and the distance between the sides 64c/64d. Such a geometry can be defined by sweeping a 2D airfoil cross-section over the desired radius (R1). Thus, the radius (R1) herein refers to a "sweep radius." In one example, the radius (R1) is from 17 centimeters to 130 centimeters. In a further example, the radius of curvature is from 17 centimeters to 51 centimeters. The tangential bowing facilitates stiffening and strengthening of the airfoil section 64, which causes an increase in modal frequency and a reduction in interlaminar stress, as compared to a baseline airfoil section with no camber and no tangential bow. Notably, use of only a small tangential bow may increase interlaminar stress in comparison to no tangential bow. Therefore, a radius (R1) of about 130 centimeters or less is desirable (where in general a larger radius is less bowed and a smaller radius is more bowed). Additionally, high degrees of bowing may become increasingly challenging to manufacture where mandrel extraction is an issue. Thus, a radius of no less than about 17 centimeters is desirable, although lower radii may be used if mandrel extraction is not an issue.

Figure 5:
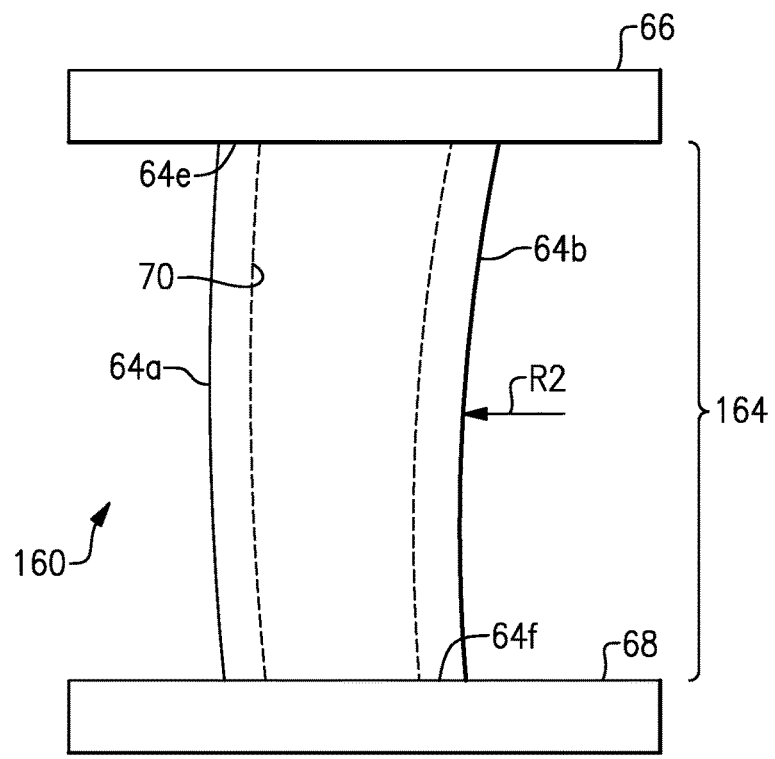
FIG. 5 illustrates an example of a turbine vane that additionally has an axial bow.

FIG. 5 illustrates a tangential view of another example of a turbine vane 160. In this example, in addition to the tangential bowing as discussed above, the airfoil section 164 is axially bowed from the outer end 64e to the inner end 64f as denoted by radius of curvature (R2). For instance, both the leading and trailing ends 64a/64b of the airfoil section 164 are continuously bowed over the full span of the airfoil section 64 from the outer end 64e to the inner end 64f. That is, each of the leading and trailing ends 64a/64b is bowed at the radius (R2, i.e., a sweep radius) over the full span. In one example, the radius of curvature (R2) is from 7 centimeters to 20 centimeters. The axial bowing may further facilitate stiffening and strengthening of the airfoil section 164, although to a lesser degree than the tangential bowing. A curvature of at least 7 centimeters and no more than 20 centimeters is desirable.

Figure 6:
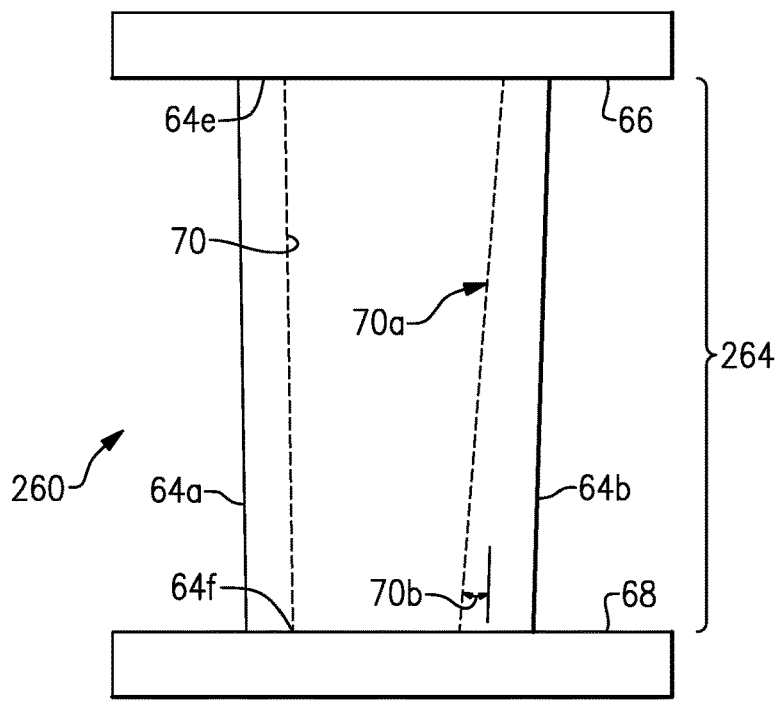
FIG. 6 illustrates an example of a turbine vane that additionally has a trailing end cavity fillet that tapers.

FIG. 6 illustrates a tangential view of another example of a turbine vane 260. In this example, in addition to the tangential bowing as discussed above and optionally also the axial bowing, the airfoil section 264 has a trailing end cavity fillet 70a (see also FIG. 3) that tapers from the outer end 64e at the outer platform 66 to the inner end 64f at the inner platform 68, relative to a radial direction. For instance, the trailing end cavity fillet 70a tapers by an angle 70b of 1 degree to 3 degrees relative to the radial direction. The tapering may further facilitate stiffening and strengthening of the airfoil section 264 as evidenced by increasing modal frequency and reducing interlaminar stress, as compared to a baseline airfoil section of teardrop shape, no camber, and no taper.

Figure 7:
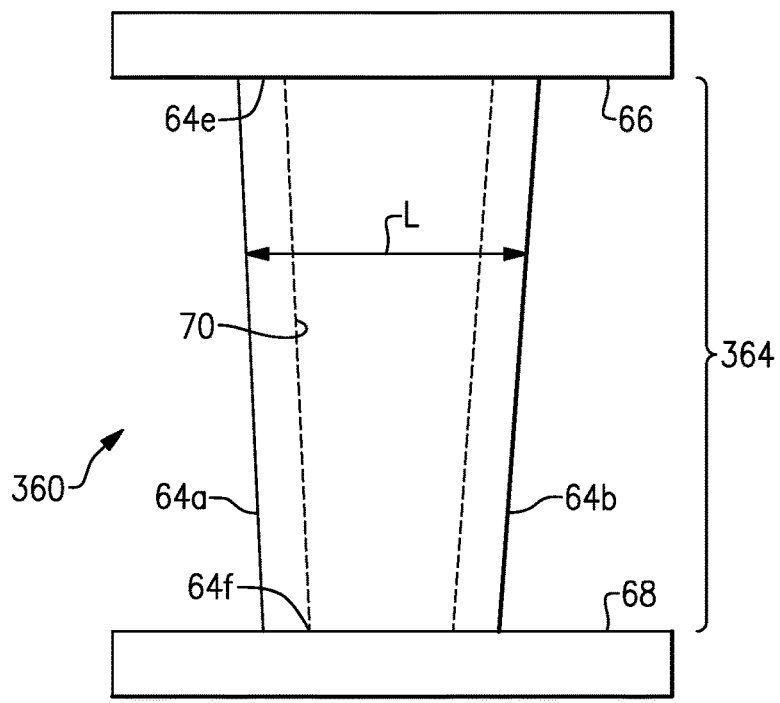
FIG. 7 illustrates an example of a turbine vane in which the airfoil section additionally tapers.

FIG. 7 illustrates a tangential view of another example of a turbine vane 360. In this example, in addition to the tangential bowing as discussed above, and optionally also the axial bowing and/or the trailing end fillet taper, the airfoil section 364 tapers from the outer end 64e at the outer platform 66 to the inner end 64f at the inner platform 68. For instance, the airfoil section 364 defines a chord length (L) from the leading end 64a to the trailing end 64b, and the airfoil section 364 tapers such that the chord length (L) continuously decreases from the outer platform 66 to the inner platform 68. In a further example, the taper is also represented by the angle of the leading and trailing ends 64a/64b relative to the radial direction. For example, each of the leading and the trailing ends 64a/64b tapers by 1 degree to 3 degrees relative to the radial direction. The tapering may further facilitate stiffening and strengthening of the airfoil section 364 as evidenced by increasing modal frequency and reducing interlaminar stress, as compared to a baseline airfoil section of teardrop shape, no camber, and no taper. In general, the tangential bowing, axial bowing trailing end fillet taper, and airfoil taper have disparate effects on stiffening and strengthening. Of these, tangential bowing has the greatest effect, followed in order by the trailing end fillet taper, airfoil taper, and axial bowing.

Airfoils according to the examples herein may be manufactured using a lay-up process in which a fiber braid, fiber layers, or other fiber structure is wrapped around a bowed mandrel. The mandrel may be provided in one or more mandrel pieces that are then extracted along an arced path from the fiber lay-up after the wrapping process. The taper of the trailing end fillet, as well as the taper of the airfoil, may facilitate extraction by serving as a draft angle that permits clearance of the mandrel from the fiber lay-up as it is extracted.

In addition to increasing structural stiffness and strength, the examples herein may also be considered as adjustments for aerodynamic performance. Any fundamental change in airfoil shape will impact aerodynamic performance. Vanes may be subject to fatigue, upstream/downstream shock, static pressure distortions, and other conditions that may change the aerodynamic response of an airfoil. In view of these, the examples herein may be useful to adjust performance and thereby address conditions that are present in a particular design implementation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
   a turbine section having a plurality of turbine vanes, each of the turbine vanes including inner and outer platforms and an airfoil section extending there between, the airfoil section being hollow and rib-less and having a first end at the outer platform and a second end at the inner platform, wherein the airfoil section is tangentially bowed from the first end to the second end with a radius of curvature that is from 17 centimeters to 130 centimeters.

2. The gas turbine engine as recited in claim 1, wherein the radius of curvature is from 17 centimeters to 51 centimeters.

3. The gas turbine engine as recited in claim 1, wherein the airfoil section defines an internal cavity that has a cavity trailing end fillet that tapers from the outer platform to the inner platform.

4. The gas turbine engine as recited in claim 3, wherein the cavity trailing end fillet tapers by 1 degree to 3 degrees relative to a radial direction.

5. The gas turbine engine as recited in claim 1, wherein the airfoil section is axially bowed from the first end to the second end.

6. The gas turbine engine as recited in claim 5, wherein the airfoil section is axially bowed with a radius of curvature that is from 7 centimeters to 20 centimeters.

7. The gas turbine engine as recited in claim 1, wherein the airfoil section defines a leading end, a trailing end, a chord length from the leading end to the trailing end, and the airfoil section tapers from the outer platform to the inner platform such that the chord length decreases from the outer platform to the inner platform.

8. The gas turbine engine as recited in claim 7, wherein each of the leading end and the trailing end tapers by 1 degree to 3 degrees relative to a radial direction.

9. The gas turbine engine as recited in claim 1, wherein each of the turbine vanes is ceramic matrix composite.

10. The gas turbine engine as recited in claim 9, wherein the airfoil section defines an internal cavity that has a cavity trailing end fillet that tapers from the outer platform to the inner platform by 1 degree to 3 degrees relative to a radial direction, the airfoil section is axially 10 bowed from the first end to the second end with a radius of curvature that is from 7 centimeters to 20 centimeters.

11. The gas turbine engine as recited in claim 10, wherein the airfoil section defines a leading end, a trailing end, a chord length from the leading end to the trailing end, and the airfoil section tapers from the outer platform to the inner platform such that the chord length decreases from the outer platform to the inner platform, each of the leading end and the trailing end tapering by 1 degree to 3 degrees relative to the radial direction.

12. An airfoil comprising:
    inner and outer platforms and an airfoil section extending there between, the airfoil section being hollow and rib-less and having a first end at the inner platform and a second end at the outer platform, wherein the airfoil section is tangentially bowed from the first end to the second end with a radius of curvature that is from 17 centimeters to 130 centimeters.

13. The airfoil as recited in claim 12, wherein the radius of curvature is from 17 centimeters to 51 centimeters.

14. The airfoil as recited in claim 12, wherein the airfoil section defines an internal cavity that has a cavity trailing end fillet that tapers from the outer platform to the inner platform by 1 degree to 3 degrees relative to a radial direction.

15. The airfoil as recited in claim 12, wherein the airfoil section is axially bowed from the first end to the second end with a radius of curvature that is from 7 centimeters to 20 centimeters.

16. The airfoil as recited in claim 12, wherein the airfoil section defines a leading end, a trailing end, a chord length from the leading end to the trailing end, and the airfoil section tapers from the outer platform to the inner platform such that the chord length decreases from the outer platform to the inner platform, each of the leading end and the trailing end tapering by 1 degree to 3 degrees relative to a radial direction.

17. The gas turbine engine as recited in claim 1, wherein the inner and outer platforms and the airfoil section are ceramic matrix composite.

18. The airfoil as recited in claim 17, wherein the airfoil section defines an internal cavity that has a cavity trailing end fillet that tapers from the outer platform to the inner platform by 1 degree to 3 degrees relative to a radial direction, the airfoil section is axially bowed from the first end to the second end with a radius of curvature that is from 7 centimeters to 20 centimeters, the airfoil section defines a leading end, a trailing end, a chord length from the leading end to the trailing end, and the airfoil section tapers from the outer platform to the inner platform such that the chord length decreases from the outer platform to the inner platform, each of the leading end and the trailing end tapering by 1 degree to 3 degrees relative to the radial direction.

* * * * *